Aug. 17, 1965     B. KRALOWETZ     3,200,474
PROFILE MILLING CUTTER FOR CIRCULAR MILLING
Filed Nov. 7, 1963                             2 Sheets-Sheet 1

INVENTOR.
BRUNO KRALOWETZ
By Kurt Kelman
agent

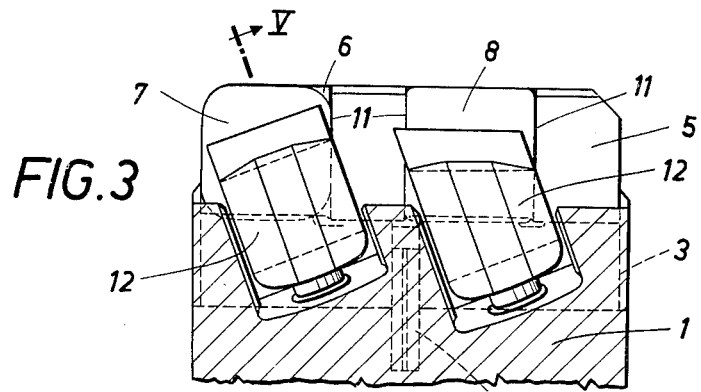
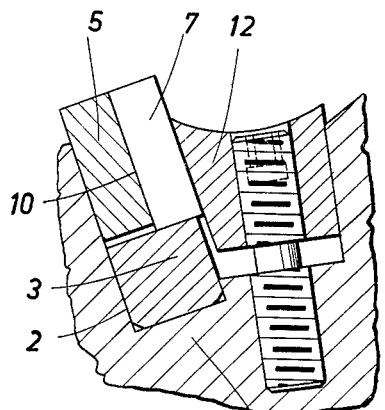
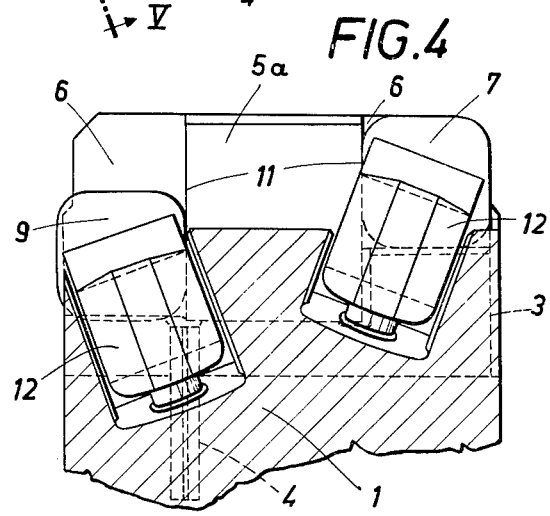
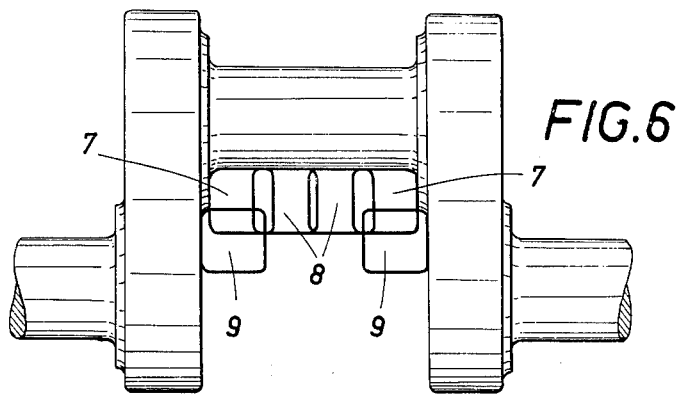

United States Patent Office 3,200,474
Patented Aug. 17, 1965

3,200,474
PROFILE MILLING CUTTER FOR CIRCULAR MILLING
Bruno Kralowetz, St. Ulrich, near Steyr, Austria
Filed Nov. 7, 1963, Ser. No. 322,226
Claims priority, application Austria, Dec. 18, 1962,
A 9,864/62
3 Claims. (Cl. 29—105)

This invention relates to a profile milling cutter for the circular milling of crankpins of crankshafts. The milling cutter comprises a cutter head which carries a multiplicity of hard metal plates extending transversely to the direction of rotation and spaced around the periphery of the cutter head so as to overlap each other in the direction of the width of the cutter head.

Recently, low-cost hard metal cutter teeth have been developed in the form of plates having the shape of square prisms with four cutting edges at each face, providing eight cutting edges when inverted. These teeth are simply discarded when all these cutting edges have become blunt so that any need for regrinding and adjustment after regrinding is eliminated.

It is an object of the invention to eliminate the disadvantages of conventional milling cutters and to provide a profile milling cutter in which such discardable plates are used and which is set with the largest possible number of tooth plates in order to provide for a high rate of stock removal and reduced machining time whereas the plates are reliably held with simple means and may be replaced or turned and inverted in a simple manner and without need for special adjusting operations.

The cutter head accordingly has transverse recesses which extend from one end face to the other and each of these recesses accommodates at least two cutter plates which are disposed one beside the other and have the shape of a square prism. One of the cutter plates in each recess serves as a corner tooth for machining the transition from the crankpin to the crankweb. Because there are always two cutter plates disposed one beside the other and their clamping means require only a small space in the peripheral direction, the cutter head may be provided with a multiplicity of such cutter plates and the stock removal may be effected by a multiplicity of such cutter teeth. The comparatively larger number of teeth increases the rate of stock removal so that the machining time is reduced. The largest amount of material must always be removed at the transition from the crankpin to the crankweb. Because a cutter plate serving for machining this transition is provided in each row, a sufficient number of teeth extending to a respective end face of the cutter head are available for the transitions.

A direct insertion of the cutter plates into the cutter head would involve great difficulties in manufacture because it is hardly possible to form the cutter head with the exactly fitting supporting surfaces required for the plates. In order to solve this problem, the invention teaches to mount common supporting blocks at the bottom of the recesses in the cutter body, which supporting blocks determine the radial depth of the insertion of the cutter plates and carry common holders, which have a plurality of openings for receiving the cutter plates, each of which openings is defined by a supporting surface of the trailing surface of the plate considered in the direction of rotation, and at least one plate supporting surface which defines the lateral position of the plate; a known clamping wedge screw-connected to the cutter head is preferably provided for each plate. It is relatively easy to make the supporting blocks and the holders as well as their openings with the required precision. Once these parts are in correct position in the cutter head, it will be sufficient to insert the cutter plates into the openings of the holders into engagement with the supporting blocks and the supporting surfaces, whereafter any need for a further adjustment will be eliminated. The plates are reliably held in the desired position by means of the clamping wedges and the holders and supporting blocks are held in position at the same time. This results in a very simple structure comprising a minimum number of parts.

According to the invention, the holders include special holders, in which the supporting faces defining one opening are oblique with respect to those of another opening of the same holder. As a result, the plates inserted into these two openings will have different inclinations with respect to the associated generatrix of the cutter head. This arrangement will be required, for instance, if a corner tooth at one end of the crankpin is to be combined with a tooth which constitutes a so-called shoulder tooth for machining a portion of the crankweb on the other side in order to provide the necessary clearance angle for both teeth.

The invention is illustrated by way of example in the accompanying drawings, in which FIGS. 1 and 2 show a profile milling cutter for a circular milling of crankpins of crankshafts in an end elevation and a top plan view taken on the periphery of the cutter, respectively.

FIGS. 3, 4 and 5 are, respectively, transverse sectional views taken on lines III—III and IV—IV of FIG. 1 and an enlarged transverse sectional view taken on line V—V of FIG. 3.

FIG. 6 is a diagrammatic representation of the distribution of the teeth over the profile to be formed.

Figure 1:
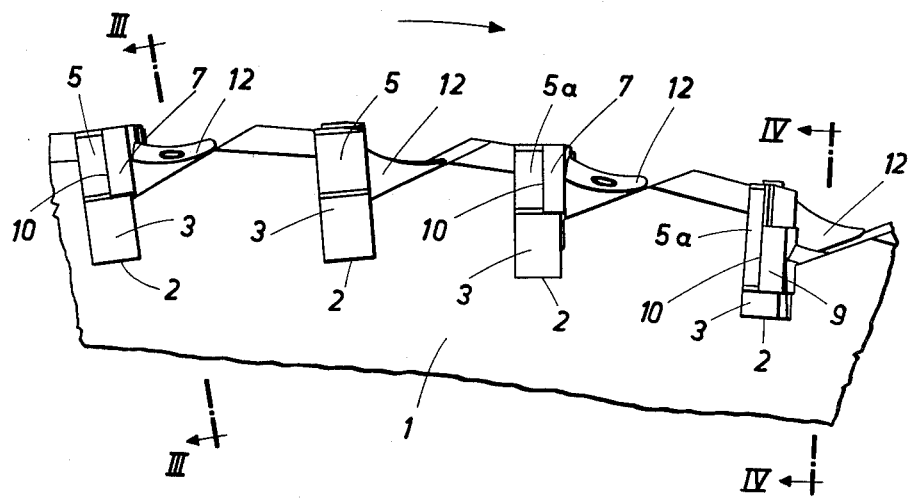

A cylindrical cutter head has a plurality of continuous recesses 2 extending from one end face to the other around the periphery of the cylindrical cutter head. Bearing blocks 3 are mounted at the bottom of these recesses and fixed in the cutter body by a pin 4. The bearing blocks carry holders 5, 5a. Each of these holders has two openings 6 for receiving hard metal cutter plates having a square prismatic shape. One plate of each pair of plates disposed one beside the other serves as a so-called corner tooth 7 for machining the transition from the crankpin of the crankshaft to the crankweb (see FIG. 6). The adjacent plates 8 constitute inner teeth for machining the crankpin or shoulder teeth 9 for machining that crankweb portion which adjoins the transition. Each of the openings of the holders 5, 5a is defined by a supporting surface 10 for the trailing surface of the tooth, considered in the direction of rotation indicated by an arrow in FIG. 1, and at least one lateral supporting surface 11, whereas the bearing blocks 3 determine the radial depth of insertion of the tooth plates. In the holders 5a, the supporting surfaces 10, 11 defining one opening are oblique with respect to those defining the other opening so that the teeth 7, 9 have different inclinations with respect to the associated generatrix of the cuter head. This is necessary to provide for the required clearance angles of the corner tooth 7 and the shoulder tooh.

Clamping wedges 12 are provided for holding the cutter plates 7, 8, 9, the holders 5 and the supporting blocks 3 in position. Each of these wedges acts on one cutter plate and is screw-connected to the cutter body 1. The holders 5 are provided on their rear with ribs 13, which engage approximately radial grooves 14 in the wall of the recesses 2.

Figure 2:
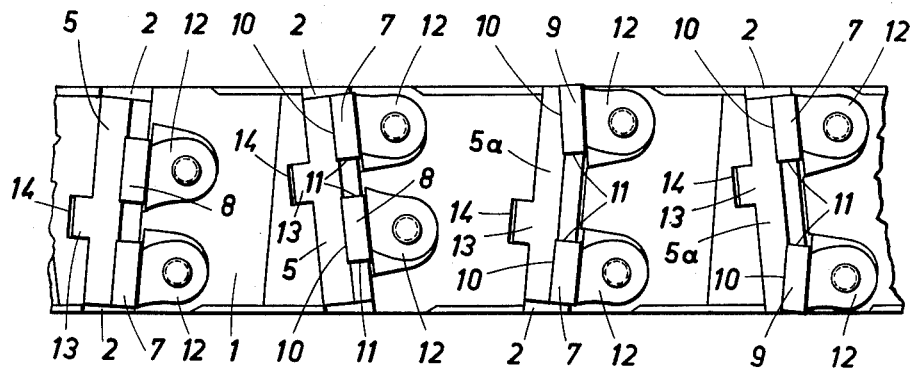

Each of the cutter plates 7, 8, 9 has eight cutting edges. When one edge has become blunt, it will be sufficient to loosen the corresponding wedge 12, remove the cutter plate from the opening 6, turn and/or invert the cutter plate, reinsert the same and fix it by tightening the wedge. When all edges have become blunt, the entire cutter plate is replaced by a new one. FIGS. 1 and 2 show that the cutter plates can be arranged with a very small pitch in the cutter body.

What is claimed is:

1. A cylindrical milling cutter head having two end faces and a periphery, the periphery of the cutter head defining a plurality of transverse recesses extending from one of said end faces to the other end face and said transverse recesses being spaced from each other around the entire periphery of the cutter head; at least two hard metal cutter plates spacedly arranged in each of the transverse recesses, each cutter plate having the shape of a square prism, and the cutter plates being transversely staggered in said recesses in relation to the cutter plates in adjacent ones of said recesses so that the cutter plates in a succession of recesses extend continuously from one of said end faces to the other end face, one of the cutter plates in each of said transverse recesses extending to one of said end faces; a bearing block mounted in each of said transverse recesses and supporting all of the cutter plates in each recess of the cutter head in a radial direction; a holder for the cutter plates in each recess, each holder having a supporting surface for a trailing face of a respective one of said cutter plates and another supporting surface for laterally positioning the respective cutter plate in the transverse recess; and a clamping wedge movably mounted on the cutter head adjacent each cutter plate and holding the same in position against said supporting surfaces.

2. The cylindrical milling cutter head of claim 1, wherein the cutter plate supporting surfaces in some of said holders for one of the cutter plates are obliquely inclined in relation to the corresponding supporting surfaces for another one of the cutter plates in the same holder.

3. The cylindrical milling cutter head of claim 1, wherein said clamping wedges are threadedly connected to the cutter head for radial movement in relation thereto.

References Cited by the Examiner

UNITED STATES PATENTS

| 104,055 | 6/70 | Murro | 29—105 |
| 833,261 | 10/06 | Tarif | 29—105 |
| 1,194,865 | 8/16 | Muller | 29—105 |
| 2,407,519 | 9/46 | Slater | 29—105 |
| 2,645,003 | 7/53 | Thompson | 29—105 |
| 2,664,617 | 1/54 | Kralowetz | 29—105 |
| 2,998,634 | 9/61 | Rachrs | 29—105 |
| 3,136,031 | 6/64 | Cassidy | 29—97 |

WILLIAM W. DYER, JR., *Primary Examiner.*